(No Model.) 6 Sheets—Sheet 1.

E. P. STILES.
DENTAL OR SURGICAL CHAIR.

No. 525,166. Patented Aug. 28, 1894.

Witnesses
Chas. J. Williamson.
Henry C. Hazard.

Inventor
Edmund P. Stiles
by Crindle & Russell
his Attorneys (No Model.) 6 Sheets—Sheet 2.

E. P. STILES.
DENTAL OR SURGICAL CHAIR.

No. 525,166. Patented Aug. 28, 1894.

Witnesses
Chas. J. Williamson
Henry C. Hazard

Inventor
Edmund P. Stiles
by Prindle & Russell
his attorneys (No Model.) 6 Sheets—Sheet 3.

E. P. STILES.
DENTAL OR SURGICAL CHAIR.

No. 525,166. Patented Aug. 28, 1894.

Witnesses
Chas. J. Williamson
Henry C. Hazard

Inventor
Edmund P. Stiles
by Pindle & Russell
his Attorneys (No Model.) 6 Sheets—Sheet 4.
E. P. STILES.
DENTAL OR SURGICAL CHAIR.
No. 525,166. Patented Aug. 28, 1894.
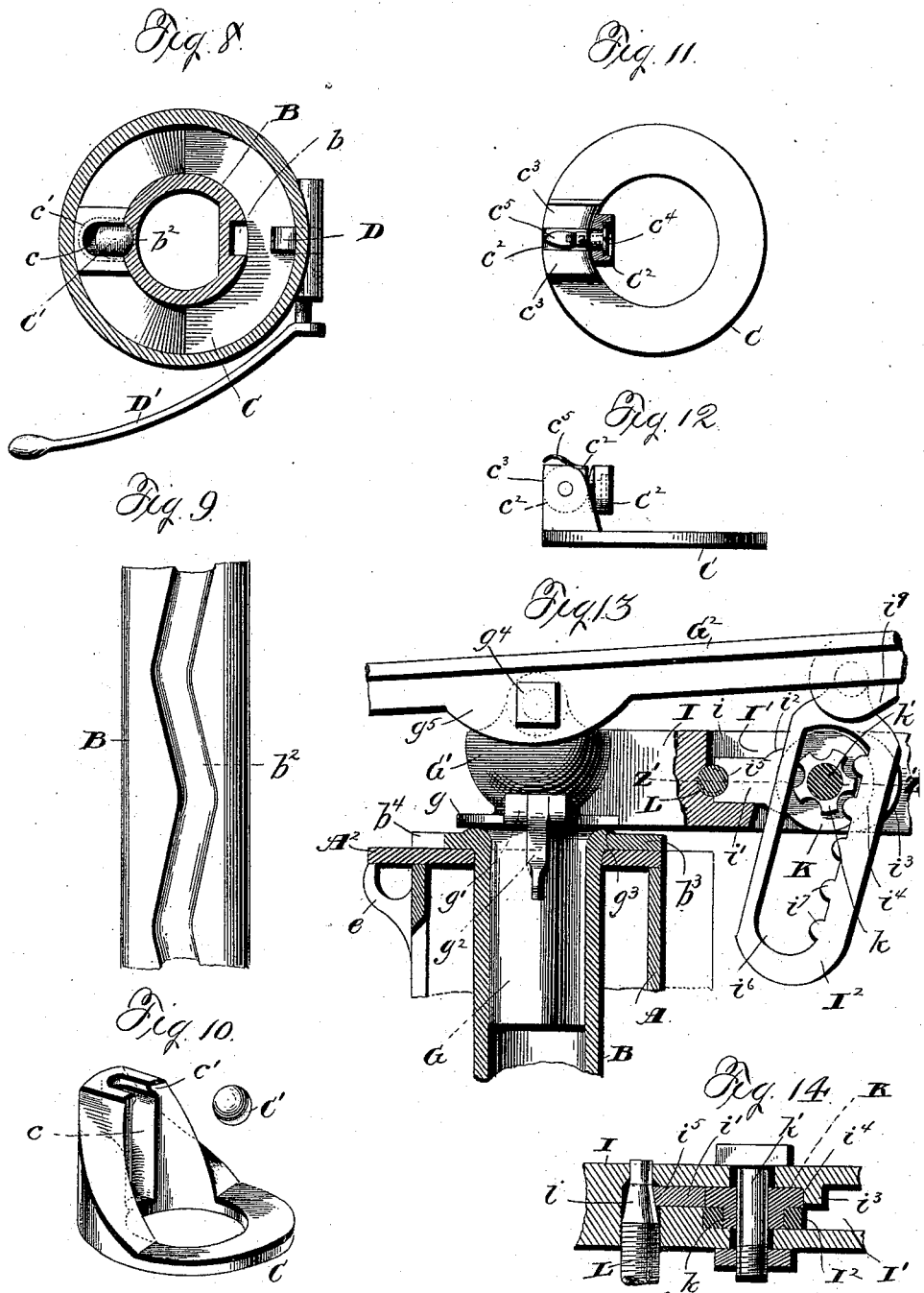
Witnesses
Chas. J. Williamson.
Henry C. Hazard.
Inventor
Edmund P. Stiles
by Prindle & Russell
his Attorneys (No Model.) 6 Sheets—Sheet 5.
E. P. STILES.
DENTAL OR SURGICAL CHAIR.
No. 525,166. Patented Aug. 28, 1894.
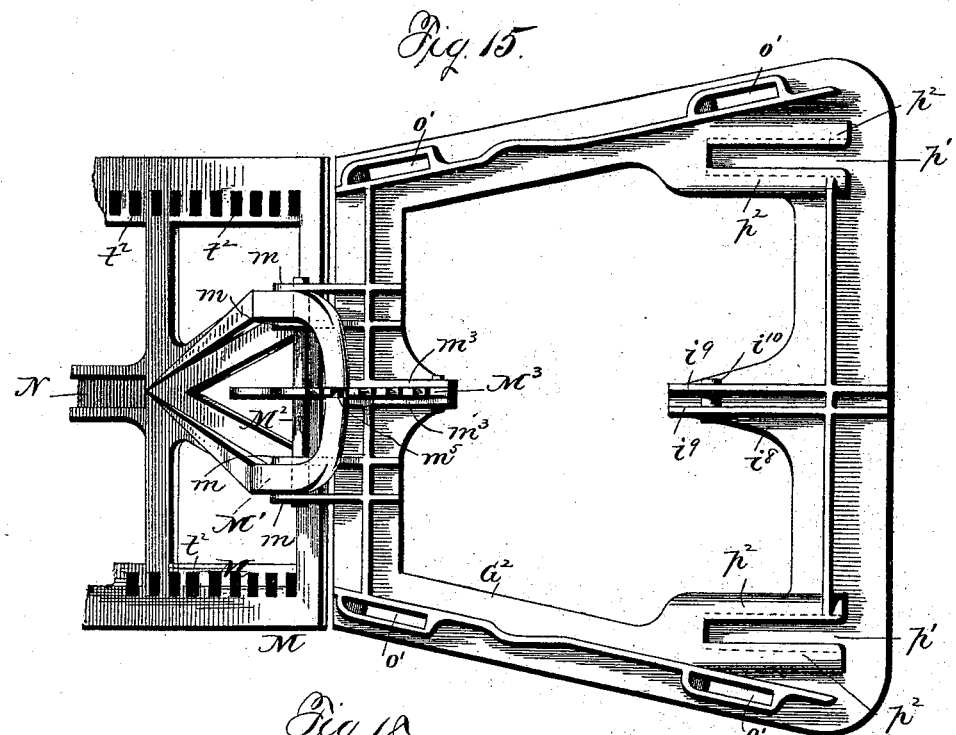
Fig. 15.
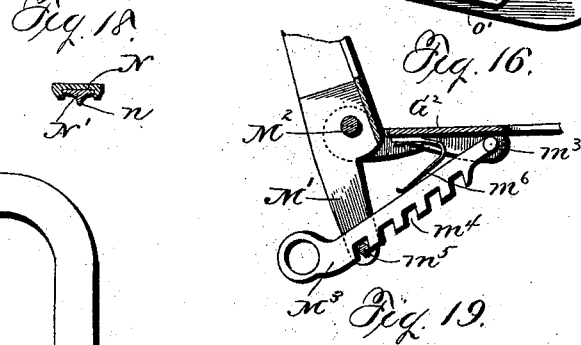
Fig. 17. Fig. 18. Fig. 16.
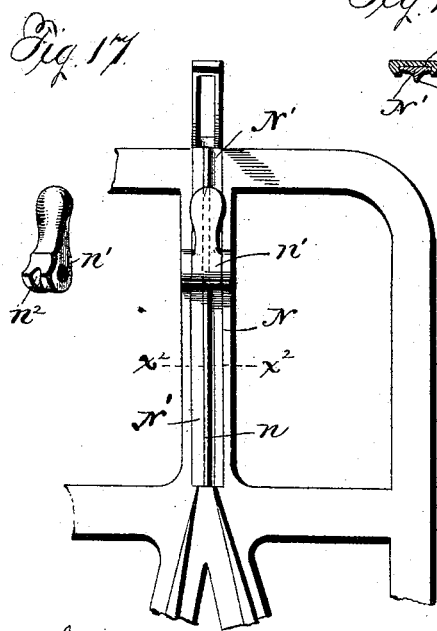
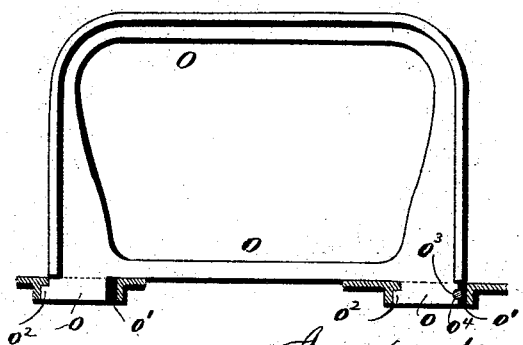
Fig. 19.
Witnesses
Chas. J. Williamson.
Henry C. Hazard.
Inventor
Edmund P. Stiles
by Prindle & Russell
his Attorneys (No Model.) 6 Sheets—Sheet 6.

E. P. STILES.
DENTAL OR SURGICAL CHAIR.

No. 525,166. Patented Aug. 28, 1894.

Witnesses
Chas. J. Williamson
Henry C. Hazard

Inventor
Edmund P. Stiles
by Pindle & Russell
his Attorneys

UNITED STATES PATENT OFFICE.

EDMUND PEASE STILES, OF AUSTIN, TEXAS.

DENTAL OR SURGICAL CHAIR.

SPECIFICATION forming part of Letters Patent No. 525,166, dated August 28, 1894.

Application filed June 3, 1891. Renewed January 22, 1894. Serial No. 497,719. (No model.)

*To all whom it may concern:*

Be it known that I, EDMUND PEASE STILES, a citizen of the United States of America, residing at Austin, in the county of Travis, and in the State of Texas, have invented certain new and useful Improvements in Dental or Surgical Chairs; and I do hereby declare that the following is a full, clear, and exact description thereof, reference being had to the accompanying drawings, in which—

Figure 1:
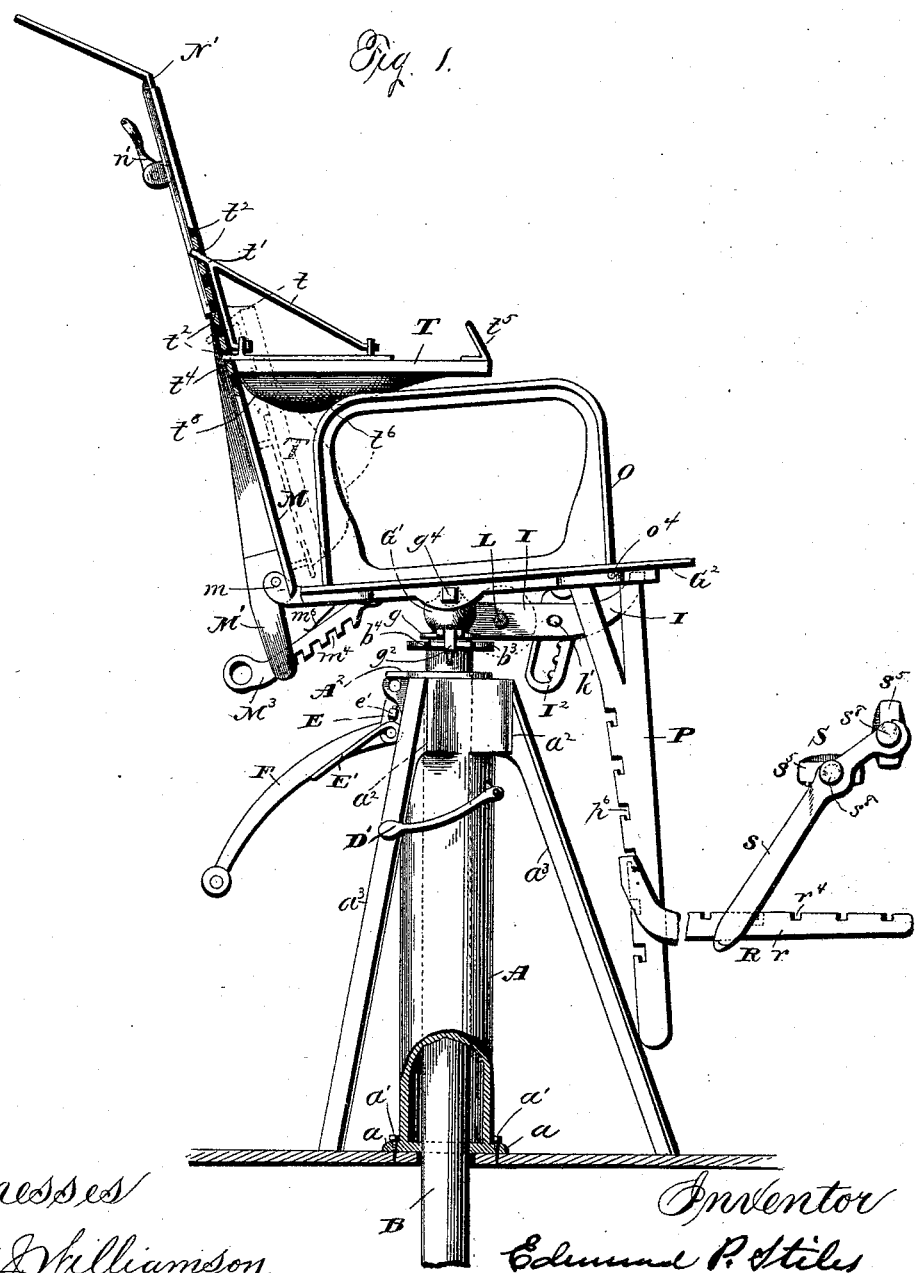
Figure 2:
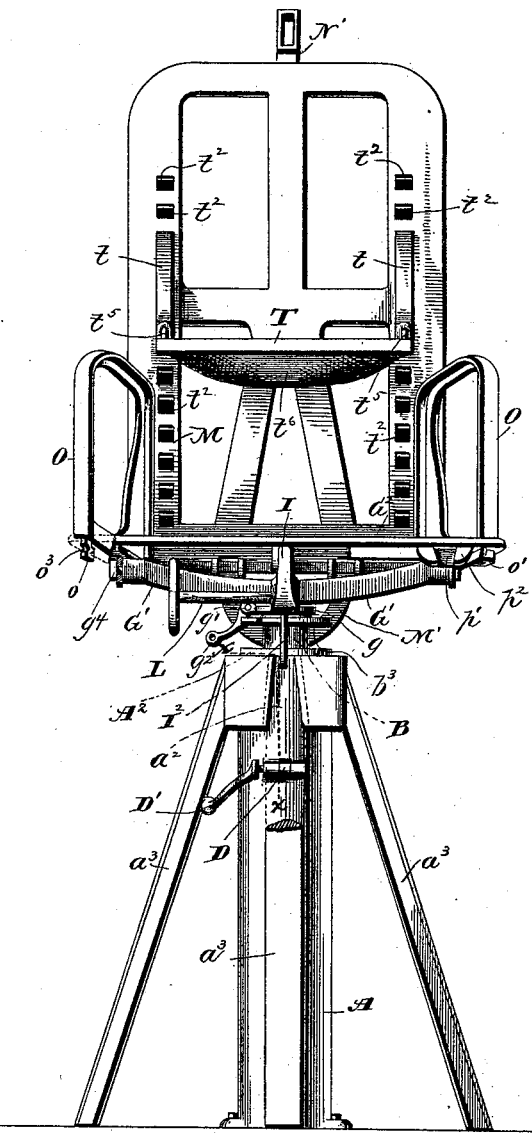
Figure 3:
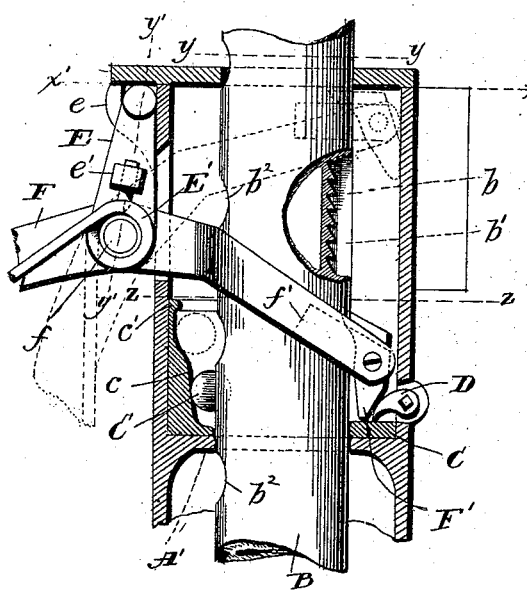
Figure 5:
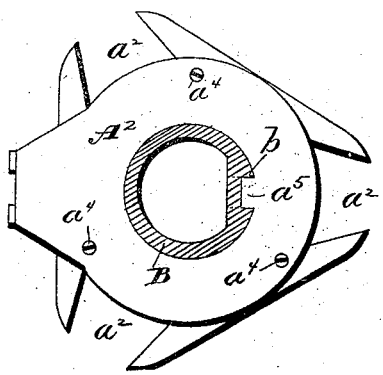
Figure 4:
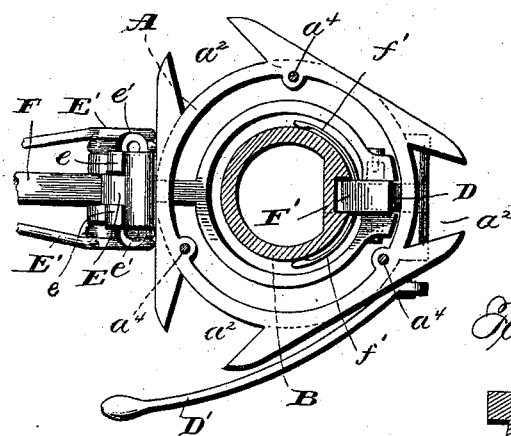
Figure 6:
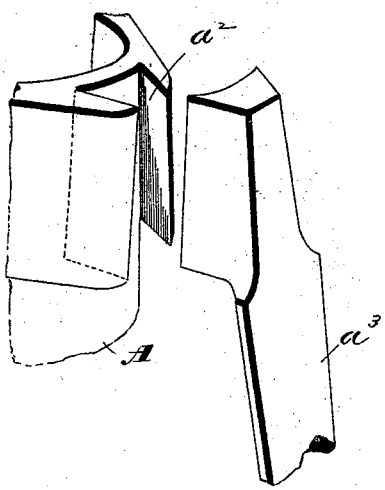
Figure 7:
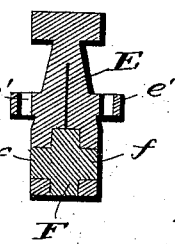
Figure 20:
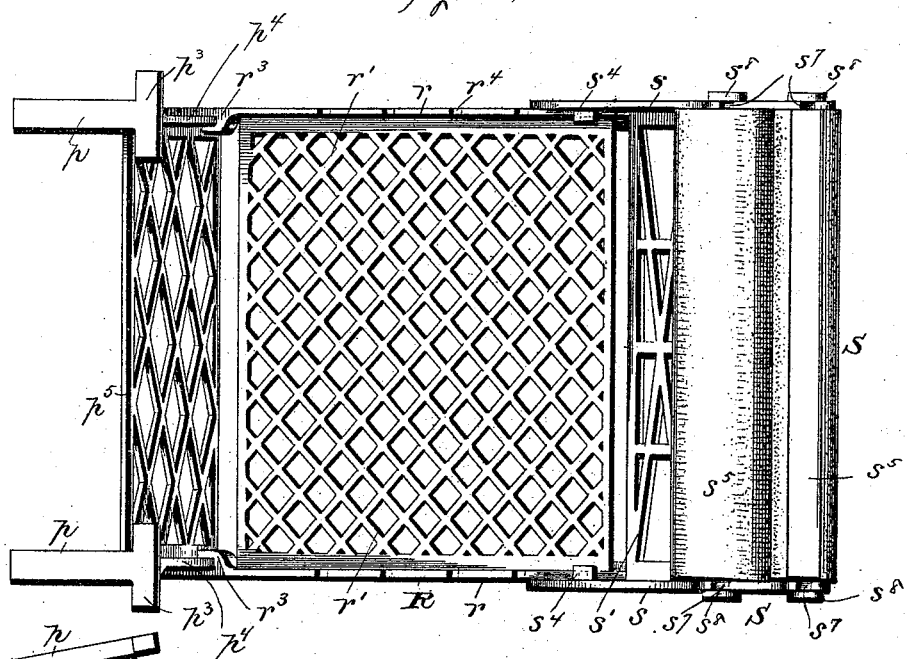
Figure 21:
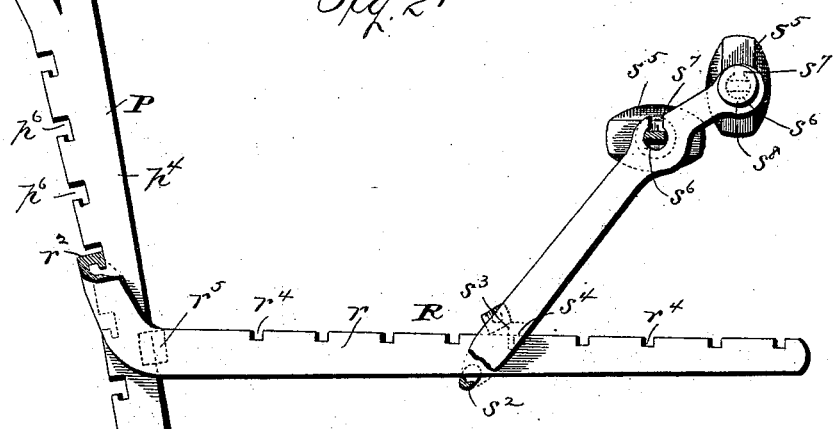

Figure 1 shows a view of my improved chair partly in side elevation and partly in vertical section; Fig. 2, a view of the same in front elevation, with the foot rest removed; Fig. 3, a view on an enlarged scale of a vertical section of the pedestal, on line $x, x$, of Fig. 2; Fig. 4, a view of a transverse section on line $x', x'$, of Fig. 3; Fig. 5, a view of a transverse section on line $y, y$, of Fig. 3; Fig. 6, a detail view of one of the pedestal legs, and its receiving socket on the pedestal; Fig. 7, a view of a section of the elevating lever supporting link on line $y', y'$, of Fig. 3, the lever raising spring being removed; Fig. 8, a view of a horizontal section on line $z, z$, of Fig. 3; Fig. 9, a view in elevation of a portion of the seat supporting plunger with the groove therein; Fig. 10, a detail perspective view of the brake piece with its ball; Fig. 11, a detail view, partly in plan and partly in section, of a modification of such piece; Fig. 12, a detail view of the same in side elevation; Fig. 13, a detail view, partly in section and partly in elevation, of the adjustable connections between the chair seat and the supporting plunger; Fig. 14, a view of a section on line $z', z'$, of Fig. 13; Fig. 15, a bottom plan view of the seat and its connection with the back; Fig. 16, a detail view in side elevation of the means for securing adjustment of the angle of the back with reference to the seat; Fig. 17, a view in elevation of the upper portion of the back with the head rest bar thereon; Fig. 18, a view of a section on $x^2, x^2$, of Fig. 17; Fig. 19, a detail view in side elevation of one of the arms attached to the seat frame; Fig. 20, a plan view of the foot rest; Fig. 21, a view of the same in side elevation, and Fig. 22, a perspective view of a device which could be used to support the base or pedestal.

Letters of like name and kind refer to like parts in each of the figures.

The object of my invention has been to provide an adjustable chair for dentists' or surgeons' use, which, while light and portable, shall be strong and capable of a wide range of adjustment, as to height of the seat, without the employment of a raising device using fluid or any sub-basal mechanism; which shall be arranged to allow all the required adjustments of the chair body with reference to its adjustable support, of the back and foot rest with reference to the seat, and of the head rest on the chair back; which shall have its elevating mechanism in the simplest and most efficient form, convenient to be handled by the operator, and be provided with means for most readily regulating and checking the descent of the chair body, when it is being lowered; and which shall have its parts capable of being put together readily, when the chair is to be used, or taken apart and packed up in the most convenient form for transportation, and with this object in view, my invention consists, in the chair, and the parts thereof, constructed, arranged, and combined as hereinafter specified.

In dental and surgical chairs, as heretofore made and used, where a wide range of vertical adjustment of the chair seat support has been desired, it has usually been necessary to have a long pedestal or base to hold and guide said support. Such a pedestal, of course, makes it impossible to lower the chair seat well down toward the floor. Where it has been attempted to avoid this objection by constructing the chair, so that a considerable elevation could be secured with a low base, the mechanism used has been objectionable, as being costly, bulky, and heavy, and employing oil which is odorous and liable to leak.

In my chair, as hereinafter described, it will be seen that none of these objectionable features exist, while I am able to use a low base or pedestal with a seat support of any desired length.

In the drawings, A designates the pedestal or base which, as shown, is made hollow, and has at its lower end flanges $a, a$, through which the screws $a', a'$, for securing it to the floor are passed. There can be any number of these flanges, or a single continuous one extending all around the pedestal and perforated at different points for the screws. At or near its upper end, the pedestal is provided with the sockets $a^2$, $a^2$, $a^2$, preferably three in number, made in the shape of upwardly tapering dovetailed grooves adapted to receive the correspondingly formed portions of the upper ends of the three detachable legs $a^3$, $a^3$, $a^3$, which are arranged to extend downward and outward and rest upon the floor to which the pedestal is attached, at some distance from the bottom of the latter. With this arrangement, the pedestal is firmly and securely braced, and cannot be tipped to one side or the other by the chair body supported from it in the manner described hereinafter, for, on account of the bearing of the legs on the floor, the top of the pedestal cannot move in either direction without also rising to a certain extent, and this it is effectually prevented from doing, not merely by the weight brought to bear upon it, but by the screws $a'$, $a'$, holding the pedestal bottom down on the floor.

Within the upper portion of the pedestal, at a point some distance below its upper end, is an annular flange or ledge A′ in which the vertically moving plunger B is guided. While the latter is shown as cylindrical, I desire it to be understood that it can be made angular in cross section, the opening within the annular flange being correspondingly shaped. In its front side is a longitudinal vertical groove $b$ along the bottom of which are the teeth $b'$, $b'$.

Fastened upon the top of the pedestal A by means of screws $a^4$, $a^4$, or otherwise, as desired, is the plate $A^2$ having the opening to receive and guide the plunger, and the lug $a^5$ engaging groove $b$ so as to keep the plunger from rotating as it moves up and down. The same end could be attained by making the plunger and the guiding opening therefor in the plate $A^2$ and flange A′ non-cylindrical. The lug $a^5$ does not extend to the bottom of the plunger groove, but is made short enough to clear the teeth $b'$, $b'$. In the plunger on the side away from the groove $b$ is another groove $b^2$ which does not run parallel to the plunger axis, but is preferably caused to run first to one side and then to the other of a straight longitudinal line. The form which I prefer is the zig-zag one, shown in Fig. 9, but I contemplate using instead a curved or straight groove running at an angle to said longitudinal line. In each case, different parts of the groove which are near each other, will be situated at different points with reference to the circumference of the plunger. Surrounding the latter and resting upon flange A′ is the ring C, one portion of which is made flat, while the other part is raised and has in its inner face a vertical groove $c$, in which is a ball C′ to engage the plunger groove $b^2$.

The upper and lower parts of the ring groove are made of different depths, the former being deep enough to allow the ball to pass into it clear of the plunger groove, while the lower part is shallower, so that the ball, while in it, will project therefrom into the plunger groove, as shown in Fig. 3. A lip $c'$ at the upper end of groove $c$ serves to prevent the ball from getting up out of the same. With the ball engaging either a zig-zag, curved, or inclined straight groove on the plunger, as the latter descends, the ring C must be rotated, and any checking of its rotation will check or slow-down the plunger's descent.

With the ball engaging groove made zig-zag the rotation of the ring C will of course be an oscillating one. Each inclined portion of the groove will rotate the ring in one direction which is opposite to that of the rotation caused by the inclines above and below said portion. The motion of the ring is always a rotary one though with the zig-zag groove is a reciprocating or oscillating rotation. When the plunger is being raised, the ball is, by the plunger groove, raised or rolled up into the deeper part of the ring groove $c$, so that the ring is no longer rotated, and the plunger can be easily and freely raised.

For checking the ring's rotation, and so, the plunger's descent, I provide the cam D, which is pivoted to the front side of the pedestal A, and is connected with an operating lever D′ within convenient reach of the operator, which can be held down by weight or spring. When this lever is depressed, the cam will be forced down upon the flat part of the ring, which I shall hereinafter term the brake-ring, and can be made to slow-down or even stop the latter's rotation, with a consequent regulation or stopping of the plunger's downward movement. In Figs. 11 and 12 is shown a modification of the brake ring, in which, instead of the ball C′, and groove $c$, a trolley $C^2$ is used, journaled upon a vertically swinging arm $c^2$ pivoted in the upright ears $c^3$, $c^3$, on the ring. A screw $c^4$ tapped into the end of the arm serves to hold the trolley thereon, its head being situated in a countersink in the latter. To hold such arm normally down in the position for the trolley to engage the groove $b^2$ in the plunger, and to return it to such position quickly, when it has been raised, by the upward movement of the plunger, just as the ball is in the other form of brake ring hereinbefore set forth, I provide the spring $c^5$ which, being fastened to the arm, is adapted to engage the inner face of the hollow pedestal.

Pivoted in ears $e$, $e$, on the pedestal, just below plate $A^2$, is the link E, whose lower end is forked to receive the plunger raising lever F which has trunnions or pivot lugs $f$, $f$, engaging suitable openings in the arms of the link fork. With the plate $A^2$ projecting out over the tops of the ears $e$ $e$ as shown the bearings for the ends of the link pivot in the ears can be made in the form of notches or open topped recesses and the plate can be utilized to retain the link pivot in them, all as indicated best in Fig. 3 of the drawings. The outer end of this lever is situated, so as to be within convenient reach of the operator, while its inner or forward end, extending in through a slot in the pedestal, is forked to extend around the plunger, as shown best in Fig. 4.

On the ends of the fork arms is pivoted the pawl F' whose upper end is adapted to be swung into and out of position to engage the teeth $b'$, $b'$, in the bottom of the plunger groove $b$, while its lower end is, on its outer side, adapted to be engaged by the brake cam D, when the pawl carrying end of the lever F is down. The contacting surfaces of the pawl and cam are so shaped that an upward turning of the latter by its lever D' will force the lower pawl end inward, so as to disengage the upper pawl end from the plunger teeth. To insure the normal engagement of the pawl with such teeth, when the cam D is not acting, as just stated, and to cause its disengagement from them as the lever end carrying it is descending after being raised, I provide two spring arms $f'$, $f'$, which being attached to the pawl project therefrom on opposite sides of the plunger, and have their ends pressed against the periphery of the latter. These arms being in frictional contact with the plunger, will swing the upper end of the pawl into tooth engaging position upon the first upward movement of the pawl lever, or downward movement of the plunger, and out of such position, as the pawl is moved down again, after being raised.

On the opposite sides of link E are eyes $e'$, $e'$, in which are held the opposite ends of spring E', which engages the outer arm of the lever F, so as to hold it normally in raised position, and to raise it again quickly, when it has been depressed and released. It will be observed that, by pivoting the lever upon the link, I secure a movable fulcrum for the former, which makes it possible for the pawl end of the lever to travel up and down in a substantially straight line within the pedestal, even when the lever stroke is a long one. There is no danger of the pawl being disengaged from the plunger teeth by movement of the lever end away from the plunger, for the wall of the pedestal effectually prevents such movement furnishing a surface substantially parallel with the plunger, which will limit the outward movement of the pawl carrying end of the latter, and will guide such end, when pressed against it, in a line parallel with the plunger side, as described hereinafter, in setting forth the operation of my mechanism.

The idea of providing for the rectilinear travel of the pawl carrying inner end of the lever, can be carried out by making the lever support a sliding, or other kind of moving one, without departure from my invention.

In the upper end of the hollow plunger provided as shown, with the flange $b^3$, having notches $b^4$, $b^4$, is journaled the upright pivot G, on the under side of the chair seat supporting yoke G', having a flange $g$ resting upon the plunger top. In suitable ears $g'$, $g'$, on this flange, is pivoted the swinging dog $g^2$ adapted to engage any one of the notches $b^4$, $b^4$, so as to hold the yoke at any desired point of rotary adjustment upon the plunger.

To make the yoke as easily rotatable as possible, the portion of the plunger top upon which its flange rests is made in the form of a rounded annular rib $g^3$ extending up above the upper face of the plunger flange. The outer ends of the yoke which, from its central portion, is curved upward and outward, are pivotally secured to the chair seat frame $G^2$ by means of bolts $g^4$, $g^4$, passing through pivotal openings in the flanges $g^5$, $g^5$, on the under faces of the frame sides, and tapped into the yoke ends, as shown in the drawings.

To provide for a tilting of the chair seat to any required angle, and a fixing of the seat as adjusted, I have on the yoke a forwardly extending bar I, whose forward end is preferably bent up into position for the front side of the seat frame to rest upon it, when the latter has been rocked forward to the desired limit of its motion. This bar is slotted longitudinally at I', and has extending inward from the end of the slot, a narrow recess $i$ which has its bottom closed. Resting in such recess is the shank of sliding block $i'$, whose outer end, away from the yoke, is provided with a crescent shaped piece $i^2$ having its concave side situated within the slot $i$ facing outward toward the end of arm I. At one side of the slot in line with block $i'$ is a fixed abutment $i^3$ of the same thickness, as the latter, having a concave face $i^4$ turned inward toward the crescent piece $i^2$. Between these two opposing curved surfaces is a disk K with pinion $k$, on its side journaled upon a bolt $k'$, which passes through openings in the bar I, made large enough to allow the disk to move into and out of close contact with the curved face of the abutment $i^3$. The distance between the corresponding curved faces of the movable block and abutment is when the block is moved inward to the extent of its motion toward the yoke G', greater than the diameter of the disk, so that the latter can rotate freely. To force the block toward the abutment, so as to clamp the disk edge between the two curved surfaces, I provide a screw L, which, tapped into the arm or bar I, has a conical or taper shank $l$ engaging notch $i^5$ in the inner end of the block. With the construction shown, if the screw be turned so as to move it inward, the conical face on its shank will force the block outward against the disk, so that the latter being crowded against the abutment $i^3$, will be held from turning on its pivot. Pivotally connected at its upper end with the chair seat frame, is the slotted link $I^2$ which, extending down through the bar slot, has on one side of its arm slot $i^6$, teeth $i^7$ to engage those of pinion $k$, so that the link cannot rise or descend without turning the disk. With this arrangement and the devices for clamping and locking the disk from rotation, I have ready and convenient means whereby the link and, consequently, the chair seat with which it is connected, can be held at any desired point of adjustment.

Any suitable form of pivotal connection between the seat frame and the link can be employed without departure from my invention.

As shown in the drawings, Fig. 15, the front side of the frame has an inwardly projecting portion $i^8$, which is provided with ears $i^9, i^9$, to which the upper end of the link is pivoted by pin $i^{10}$. Instead of this arrangement, a rod attached to the sides of the frame, and extending through a suitable opening in the link, could be used.

Extending down from the chair back frame M, is the rigid U-shaped piece M' preferably formed of continuations of ribs on the middle lower part of the back frame. The legs or sides of this piece are pivoted in arms $m, m, m, m$, on the seat frame, by means of a rod $M^2$, passing through said piece and arms.

Pivoted in ears $m^3, m^3$, on the under side of the seat frame, is an arm $M^3$, which has on its under side a series of notches $m^4, m^4$, to engage the central lower part $m^5$ of piece M'. A spring $m^6$ forces said arm down toward part $m^5$, so as to keep it normally in position with one of its notches engaging such part, while a convenient handle or hand piece is provided whereby the arm can be raised to leave the back free to be moved to change its angle with reference to the seat.

On the rear face of the upper part of the back frame is a groove N, to receive the bar N', which is to carry the head rest, not shown. This bar, which has its upper end bent back at an angle, and slotted longitudinally, has along the rear side of its main portion a longitudinal strengthening rib $n$.

Pivoted to the chair back, so as to extend across the groove N, is the bar clamping cam $n'$ provided with the groove $n^2$ adapted to receive the rib $n$. The construction and shape of the cam is such that the bar will be most firmly clamped against movement, or left free to be moved, as the cam is turned up or down.

While I have shown no head rest, and contemplate using any desired form of such device, the one which I prefer to use with the slotted bar is like that shown in my United States Patent No. 361,906.

Each arm O is detachably secured to the seat frame, and consists essentially of an open metallic frame provided on its lower side with the tenons or lugs $o, o$, adapted to pass through narrow slots $o', o'$, in the sides of the seat frame, and provided on corresponding ends with shoulders $o^2, o^2$, adapted to be brought under the ends of the respective slots, as the arm is moved longitudinally in one direction. Above such lugs the arm is adapted to bear firmly upon the seat frame. In one of the lugs $o'$, at its end away from the respective shoulder, is a notch $o^3$ adapted to be engaged by a pin or screw $o^4$ on the seat frame, when the arm has been moved to cause the shoulders $o^2, o^2$, to project beyond the slot ends. As shown, this fastening pin or screw passes through a flange which runs along the under face of the seat frame side.

The foot rest which I show, is detachably connected with the seat frame, and consists of several parts which are adjustably and detachably connected together. Of such parts the one designated by P is the upright, having on opposite sides of its upper end the dove-tailed plates $p, p$, adapted to fit in correspondingly shaped grooves $p', p'$, between ribs $p^2, p^2$, on the under side of the seat frame, and having at their forward ends cross pieces $p^3, p^3$, to bear against the ends of the ribs, so as to limit the rearward movement of the plates in the receiving grooves. These cross pieces also tend to steady the upright P, by engaging the under face of the frame to which the foot rest is attached.

Connecting the two side bars $p^4, p^4$, is the light open-work plate $p^5$, which can be attached to the bars by means of dove-tailed ribs engaging suitably shaped grooves in the latter. Each bar $p^4$ has on its rear side a series of hook-shaped notches $p^6, p^6$, each consisting of a large inwardly extending slot and a smaller downwardly extending one.

The horizontal lower part R consisting essentially of two side bars $r, r$, which are, like the corresponding parts of upright P, connected by a light open-work or reticulated plate $r'$, has the rear ends of its bars bent upward and rearward, and provided on their upper ends with hook shaped lugs $r^2, r^2$, adapted to enter and engage any of the notches $p^6, p^6$.

On the inner sides of the bars, at the lower ends of their upturned portions, are clips $r^3, r^3$, adapted to embrace and rest against the forward edge of the upright side bars $p^4, p^4$, as shown best in Figs. 20 and 21, when the lugs $r^2, r^2$, are in some of the notches $p^6, p^6$, and the side bars of the base are substantially horizontal. Along the upper edges of bars $r, r$, are the notches $r^4, r^4$, arranged, so that those on one bar are opposite the ones on the other.

The part S, carrying the devices for receiving the feet of the occupant of the chair is, like the other parts of the foot rest in general construction, consisting of side bars $s, s$, connected by the open work plate $s'$. On each bar $s$, at and near its lower end respectively are the upturned and downturned hook clips $s^2, s^3$, adapted to engage and embrace the lower and upper edges of the bars $r, r$. Also situated on the inner side of each bar $s$ is a lug or projection $s^4$, adapted to engage any one of the notches $r^4$.

With the construction described, the engagement of the clips $s^2, s^3$, with the bars $r, r$, will limit the outward swing of part S, and cause it to stand up from the base R at the desired upward and outward inclination, while the lugs $s^4, s^4$, engaging notches $r^4, r^4$, effectually keep it from outward movement along the base.

Supported upon the upper portion of part

S are the two rollers $s^5$, $s^5$, suitably upholstered or covered, to receive the feet of the occupant of the chair. For receiving the pivots of these rollers, the bars $s$, $s$, are provided with the two openings $s^6$, $s^6$, with slots $s^7$, $s^7$, extending down to their upper sides. To allow them to be passed in or out through these slots, the roller pivots are flattened on opposite sides, as shown in the drawings, while, to prevent their endwise movement in the bearings, their outer ends are provided with heads $s^8$, $s^8$, adapted to engage the outer sides of bars $s$, $s$.

In order to secure a self adjusting support for the feet, the roller bodies are made not cylindrical, but flattened on opposite sides, so as to have long and short diameters, as shown in the drawings.

The child's seat T, which I prefer to use with my chair, is, in general shape and construction, like that shown in my United States Patent No. 294,286, and is, when used as a seat, to be supported in the same way from the chair back. It has the folding bracket arms $t, t$, provided with portions $t', t'$ to enter the apertures $t^2, t^2$, in the two outer bars of the frame of the chair back, and the projections $t^4, t^4$, adapted to engage some of the apertures $t^2, t^2$, below those which the portions $t', t'$, enter, so as to support the seat in position to be occupied by the child to be operated upon, but in the present case is adapted for use as an adjustable support for the small of the back of the chair occupant when it is not serving as a seat. For this purpose, I provide it with obliquely placed lugs $t^5, t^5$, on its upper side at or near its forward edge, which can be caused to engage the apertures $t^2, t^2$, so as to support the seat, when placed flat against the chair back, as shown best in Fig. 1. What is then the outer side of the seat is, preferably, cushioned or upholstered, as indicated at $t^6$, to most comfortably support the back of one sitting in the chair.

Figure 22:
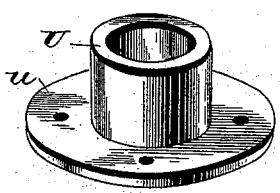

The pedestal legs which I have shown and described, are made straight for convenience in packing, but can be made curved, or of any shape desired. Instead of them, a flanged socket U, such as is shown in Fig. 22, can be detachably secured upon the lower end of the pedestal, so that its flange $u$ will rest upon the floor at some little distance from the pedestal base. This construction might be simpler and neater than the one in which the legs are used, but it is not so convenient for packing and transportation.

I have not shown any upholstering on the chair seat, as my present invention has nothing to do therewith. The seat, as well as the arms and head rest, can be upholstered or cushioned in any desired way, without involving any departure from my invention. With the open chair seat frame shown and described hereinafter, any suitable material can be stretched across it to make a foundation for a cushioned seat, and such material can, of course, be attached to the seat frame, or to a separate frame supported upon the latter.

The manner of using my improved chair is briefly as follows:—With the hollow pedestal provided with its steadying legs in their sockets, or its flanged collar described hereinbefore, and having its base fastened to the floor by the screws $a', a'$, passing through the flanges or lugs $a, a$, the chair body supported on the plunger moving and guided within the pedestal is held securely from being tipped over, for its center of gravity cannot be moved to one side without the using of the pedestal, which cannot take place without a pulling out of its base fastening screws $a', a'$. Normally, the lifting lever, being swung up by the spring E', stands with its pawl carrying forked end depressed, as shown in full lines in Fig. 3. The lower end of its plunger raising pawl then rests upon the flat part of brake ring close to the inner end of the cam D, while the upper pawl end stands out of engagement with the teeth on the plunger. The cam, being pressed down upon the ring by its weighted lever D', effectually prevents the ring from rotating, and as, because of the engagement of the ball or trolley with the serpentine, zig zag, or inclined groove in the plunger, holds the latter from descending.

If the chair body is to be depressed, the cam is, by its lever, lifted from the ring, so as to leave it free to rotate upon its support within the pedestal, as the ball or trolley is moved to one side or the other by the different parts of the plunger groove. The plunger can then descend, but its movement is regulated and prevented from being too rapid by the action of the brake ring. The cam, as it rises, engages the outer side of the lower end of the pawl F', so as to keep the upper end thereof from moving inward into engagement with the teeth $b'$ $b'$, at the bottom of the longitudinal groove $f$, in the plunger. When the chair body has descended far enough, the cam lever is dropped, so that the cam presses upon the ring again and stops its rotary movement. With either a serpentine, zig zag, or other shaped groove, each part of which is inclined with reference to the plunger periphery, or has a situation with reference to the circumference of the plunger different from that of the adjoining parts, obviously, as long as the ball or trolley on the brake ring engages said groove, there can be no longitudinal movement of the plunger, without some rotation of the ring, a continuous rotation in one direction where a slight inclined groove on the plunger is used and a reciprocating or oscillating rotation where the groove is serpentine or zigzag, and a stoppage of the latter by the cam, means a holding of the plunger from descent. When the chair body is to be elevated, the lever is operated to raise its shorter forked end. As such end rises, the spring arms on the pawl which it carries, are, by their frictional contact with the plunger periphery, retarded, so that the pawl is swung to bring its upper end at once into engagement with the teeth $b'$, $b'$, on the plunger. As the plunger is then caused to travel with the pawl end of the lever, the ball or trolley on the brake ring will, by the action of the engaging groove, be moved upward and outward, until it and said groove are no longer in engagement to cause the ring to rotate, as the plunger rises. Where the ball is used it rolls upward into the deeper part of the ring groove, from which it tends to run down again into the shallower lower part.

The trolley being pivoted on the swinging arm is swung upward and outward, so as to compress its spring against the wall of the pedestal. Such spring then exerts a pressure tending to throw the trolley bearing arm down to its normal position again. With the ball or trolley moved upward and outward so as to disengage it from the groove in the plunger, the latter's continued upward movement can be free and unimpeded, as it does not cause rotation of the brake ring. As the pawl carrying end of the lever rises, the lever fulcrum on the link E moves, so as to allow said end to travel within the pedestal in a substantially straight line. By making the fulcrum a movable one capable of motion toward and from the plunger, I secure a very advantageous result, in that I can get a long perpendicular stroke of the pawl carrying lever end within a pedestal of small size. With a fixed fulcrum, the pedestal would have to be made quite large, and consequently, heavier, or be provided with a bulge to allow space for the travel of the lever end and pawl in a curved path, and the pawl would have to be considerably modified in shape to remain throughout its upward movement in proper engagement with the teeth on the plunger.

In the construction shown in the drawings, as the pawl engaging the plunger teeth rises, the outer side of its lower end can ride along the inner face of the pedestal, which serves to limit the outward swing of such end, under the weight of the plunger and chain. Instead of this arrangement, the lever could, if desired, be provided with a limiting stop or shoulder to engage any suitable part of an abutment on the pawl. When the lever has been raised and is released, its spring E′ returns it to its normal position ready for another plunger elevating stroke. As the pawl descends, it is swung outward away from the plunger teeth by the action of its friction spring arms. When the plunger, unsupported by the pawl tends to descend, the ball on the brake ring, by the action of its gravity, descends at once into the lower shallower part of the groove in the ring upright, and, projecting therefrom, engages the groove $b^2$ in the plunger, so as to prevent any descent of the latter without rotation of the ring. With the cam lever D′ depressed, and the cam bearing upon the flat part of the ring, this rotation cannot take place, and the plunger will be held at the point to which it has been raised. Where the trolley on the pivoted arm is used instead of the ball C′, the spring $c^5$ will throw it down into the plunger groove, as the upward movement of the plunger ceases. If further elevation of the chain seat is needed, the raising lever can be operated repeatedly, as required. As the plunger can extend to any distance through the base of the pedestal, it may be made of any desired length without respect to that of the pedestal. The latter can then, because the adjusting mechanism takes up but little space in its upper end, be made quite short or low.

Any required rotary adjustment of the chair body can be made, if the dog $g^2$ be lifted from the notches in the plunger flange, and dropped again, when the adjustment has been completed.

When the angle of the seat is to be changed the screw L is turned to release the shank of the block $i'$, so that the disk K will no longer be clamped between the crescent shaped piece on the block, and the concave face $i^4$, of abutment $i^3$ on the bar I. The seat can then be tilted, as desired, upon its pivotal supports on yoke G′, for the disk and pinion $k$ thereon engaging the teeth of slotted link I′, are free to rotate. The desired tilting having been finished, the screw L is turned to cam the block $i'$ out toward the abutment $i^3$, so as to cause the disk to be firmly clamped again between the concave faces on the block and abutment.

The angle of the back with reference to the seat is easily and simply adjusted by raising the notched arm $M^3$ away from the part $m^5$ on the piece or frame M′, moving the back to the desired position and lowering the arm, so that it will engage part $m^5$ with one of its notches again.

The height of the head rest can be altered by turning the clamping cam $n'$ to release the bar N′, raising or lowering the latter, and causing the cam to clamp it again.

The adjustment of the child's seat will be fully understood from my Patent No. 294,286, hereinbefore referred to, and the drawings of this case. When it is not being used as a seat, but as a support for the small of the back of the chair occupant, it can be secured at any desired height by inserting its hooked lugs $t^5$, $t^5$, in the proper apertures $t^2$, $t^2$, in the outer bars of the frame M.

The foot rest is made adjustable both as to height of foot receiving surface and distance of the same from the chair seat. The lower horizontal part can be, raised or lowered, if it be tilted up to disengage its hooked lugs $r^2$, $r^2$ from the receiving notches $p^6$, $p^6$, in the side bars of upright part P. When it has been moved to bring its lugs into position to engage other ones of notches $p^6$, $p^6$, it is swung down again, so as to carry the lugs into the notches, and cause the clips $r^3$, $r^3$, to engage the edges of the upright bars.

To adjust the roller carrying part toward or from the seat, all that is necessary is to tilt it up, until its lugs $s^4$, $s^4$, are raised out of notches $r^4$, $r^4$, move it inward or outward, and swing it back into its upwardly and outwardly inclined position again.

With the two flattened rollers or rotary bars forming the foot supporting surface, as described hereinbefore, as the feet are placed upon them both rollers will turn to bring their flat sides to rest squarely against the portions of the feet engaging them, at whatever angle such portions may be.

My chair, arranged and constructed, as shown and described, is cheap and simple in construction, and not liable to get out of order. Its various parts are made as light as possible, and capable of being readily put together or taken apart, so as to be in most convenient form for packing and transportation.

The pedestal, which can be short and low, whatever the length of the chair seat supporting plunger may be, is a small and light one, having steadying legs, which can be readily separated from it and conveniently packed.

The elevating mechanism is a simple and light one which is capable of raising a plunger of any length, without any sub basal mechanism on the pedestal, while the means for regulating the descent of the plunger and locking the latter at any point, is certain and efficient in its action without having any heavy or complicated devices.

The various parts of my improved chair, put together, as shown, and described hereinbefore, are all obviously, capable of being readily taken apart and put together, and, when disconnected, are in the best and most convenient shape for packing. My chair then, while light, strong, and well arranged to allow all the various adjustments which could be desired, is a portable one, especially well adapted for taking down, transporting and setting up again, whenever it is to be used.

Having thus described my invention, what I claim is—

1. In an adjustable support for dental, surgical, and other chairs, in combination with the movable plunger, and a suitable base to hold and guide the same, the lever having its fulcrum movably supported so as to move toward and from the plunger engaging devices on the lever and plunger, whereby the latter will be raised, as the lever rises, and a guide to prevent the part of the lever carrying the plunger engaging device, from moving away from the plunger, as the lever swings to raise the latter, substantially as and for the purpose specified.

2. In an adjustable support for dental, surgical, and other chairs, in combination with the movable plunger and a suitable base in which the latter is guided, the lever, the swinging link on which the lever fulcrum is supported, so as to swing toward and from the plunger engaging devices on the plunger and lever end whereby the lever will raise the plunger, and a guide to prevent the part of the lever carrying the plunger engaging device from moving away from the plunger, as the lever swings to raise the latter, substantially as and for the purpose shown.

3. In combination with the movable plunger and a suitable pedestal in which the same is guided, the plunger raising lever having its fulcrum supported, so that it can move to and from the plunger, a pawl on the lever, teeth on the plunger, and a guide to prevent the pawl carrying part of the lever from moving away from the plunger, as it moves to raise the latter, substantially as and for the purpose set forth.

4. In combination with the movable plunger provided with one or more teeth and a suitable pedestal in which the plunger is guided, the plunger raising lever having its fulcrum supported, so that it can move to and from the plunger, a pawl on the lever, and a guide to prevent the movement of the pawl carrying part of the lever away from the plunger, adapted to engage and limit the swing of the pawl, as the lever moves to raise the plunger, substantially as and for the purpose specified.

5. In combination with the movable plunger provided with one or more teeth, and the plunger guiding pedestal, the plunger raising lever having its fulcrum movably supported from such pedestal, the pawl on the lever, and a guiding surface on the pedestal to engage the end of the lever and the tail of the pawl as the lever moves to raise the plunger, substantially as and for the purpose shown.

6. In combination with the toothed plunger and the pedestal in which it is guided, the lever, the plunger raising pawl thereon and a friction piece carried by the pawl normally in engagement with the plunger, so as to swing the pawl into operative position, as it is raised by the lever, substantially as and for the purpose specified.

7. In combination with the toothed plunger and the pedestal in which it is guided, the lever, the pawl thereon, and one or more spring arms engaging the plunger surface frictionally, substantially as and for the purpose specified.

8. In combination with the plunger and the hollow pedestal in which it is guided, the lever forked to embrace the plunger, suitable engaging devices on the lever and plunger, the engaging device on the plunger being situated between the plunger and the inner wall of the hollow pedestal, and the lever fulcrum supported, so as to be movable from and toward the plunger, substantially as and for the purpose shown.

9. In combination with the toothed plunger and the hollow pedestal in which it is supported, the lever forked to embrace the plunger, the pawl on the fork, arms between the plunger and the inner wall of the pedestal, and a movable fulcrum for the lever, substantially as and for the purpose set forth.

10. In combination with the toothed plunger and the hollow pedestal within which it is supported, the forked lever, the pawl on the fork arms, the spring arms on the pawl engaging frictionally the plunger periphery, and the fulcrum, of the lever made movable from and toward the plunger, substantially as and for the purpose described.

11. In combination with the toothed plunger, and the pedestal in which it is guided, the plunger raising lever, the pawl thereon, and a lever connected with a movable device to engage the pawl and move it out of tooth engaging position, substantially as and for the purpose specified.

12. In combination with the plunger raising lever, the swinging link in which its fulcrum is supported and a spring attached to the link and engaging the lever so as to raise the same, substantially as and for the purpose shown.

13. In combination with the plunger raising lever, the swinging link in which the fulcrum of the lever is supported, and a spring having its opposite ends held in sockets on the link, and its main or middle portion engaging the lever, substantially as and for the purpose set forth.

14. In combination with the plunger and the pedestal in which it is guided, the means for regulating the descent of the plunger, consisting of a movable piece resting upon a suitable support on the pedestal so as to be movable thereon in a different direction from the plunger, one or more inclines on the plunger, and connections between the movable piece and such incline or inclines, whereby the piece is caused to move on its support, as the plunger descends, substantially as and for the purpose described.

15. In combination with the plunger, and the pedestal in which it is guided, the means for regulating and checking its descent, which consists of a movable piece resting upon a support on the pedestal connections between the piece and plunger, whereby the latter is caused to move on its support, as the plunger descends, and means for stopping the movement of the piece, substantially as and for the purpose shown.

16. In combination with the plunger and the pedestal in which it is guided, the brake ring resting upon a support on the pedestal, and connections between the same and the plunger whereby it is caused to rotate on its support, as the plunger descends, substantially as and for the purpose set forth.

17. In combination with a suitable support or pedestal, the plunger guided therein, so as to be prevented from rotating and provided with a groove whose different parts run at an angle to a longitudinal line, and the rotary brake ring resting upon a support on the pedestal and provided with a device to engage the plunger groove, so as to cause the ring to rotate, as the plunger descends, substantially as and for the purpose described.

18. In combination with a suitable support or pedestal, the plunger guided longitudinally and prevented from rotation therein, and having a groove whose different parts run at an angle to a longitudinal line along the plunger, the brake ring provided with a device to engage the plunger groove, so as to cause movement of the ring on its support, as the plunger descends and means for forcing the ring down upon its support to prevent its rotation thereon, substantially as and for the purpose specified.

19. In combination with a suitable pedestal, the non rotating plunger guided therein provided with a zig zag groove, the brake ring resting upon a support on the pedestal, and a device on the ring engaging the plunger groove, substantially as and for the purpose shown.

20. In combination with a suitable pedestal, the non rotating plunger guided therein and provided with the zig zag groove, the brake ring resting upon a support on the pedestal, a device on the ring engaging the groove, so as to move the ring, as the plunger descends, and means for stopping the motion of the ring on its support, substantially as and for the purpose set forth.

21. In combination with the reciprocating plunger provided with a groove whose parts are inclined with reference to a longitudinal line, a suitable support, a movable piece resting thereon, and a device on such piece adapted to normally engage the groove in the plunger, and made movable upward and outward away from such groove, substantially as and for the purpose described.

22. In combination with the reciprocating plunger provided with a groove whose parts are inclined with reference to a longitudinal line, a suitable support, a movable piece resting thereon provided on its inner face with an upright groove having the shallow lower and deeper upper part, and the ball in such groove, substantially as and for the purpose specified.

23. In combination with the reciprocating plunger provided with a groove, whose parts are inclined to a longitudinal line, a pedestal in which the plunger is guided, a support on such pedestal, the ball to engage the plunger groove, the brake ring resting upon the support on the pedestal having the upright ball receiving groove, which at its lower end is made of a depth less than the diameter of the ball, and above such end is made deep enough to allow the outward movement of the ball away from the plunger groove, and means for preventing the ball from getting up out of the ring groove, substantially as and for the purpose shown.

24. In combination with the toothed reciprocating plunger and a suitable pedestal in which it is guided, a support on the pedestal, the brake ring resting thereon, connections between such ring and the plunger whereby the ring is caused to rotate, as the plunger descends, the raising lever, a pawl thereon, and a movable cam to press upon and stop the ring from rotating, adapted to engage and move the pawl out of operative position, as it is raised from the ring, substantially as and for the purpose set forth.

25. In combination with the plunger raising lever and the pedestal, the ears upon the latter, the links having pivots journaled in the ears, the trunnions on the lever journaled in the link and the plate on the pedestal, adapted to retain the link pivots in the pedestal ears, substantially as and for the purpose specified.

26. In combination with the chair seat frame and the yoke upon which it is pivoted, the bar on the yoke, the connected disk and pinion journaled upon the bar, a link pivoted to the chair frame, and having teeth to engage the pinion, and a brake device adapted to be forced against the disk to hold it from rotating, substantially as and for the purpose described.

27. In combination with the yoke and the chair seat frame pivoted thereon, the bar on the yoke provided with an abutment, the connected disk and pinion journaled on the bar, so as to be movable toward and from the abutment, the toothed link connected with the chair frame, a movable piece on the bar to engage the disk and force it against the abutment, and means for moving such piece toward the abutment, substantially as and for the purpose specified.

28. In combination with the yoke and the chair seat frame pivoted thereon, the bar on the yoke provided with an abutment, the connected disk and pinion journaled on the bar, so as to be movable to and from the abutment, the toothed link connected with the seat frame, the movable block on the bar adapted to clamp the disk against the bar abutment, and an adjustable cam engaging such block, so as to move it toward the abutment, substantially as and for the purpose shown.

29. In combination with the yoke and the chair seat frame journaled thereon, the slotted bar on the yoke provided with an abutment within its slot, the slotted and toothed link connected with the seat frame, the connected pinion and disk in the slot journaled on the bar, so as to be movable toward and from the abutment, the movable block to clamp the disk against the abutment, and the screw with conical shank engaging the block, so as to force it toward the abutment, substantially as and for the purpose set forth.

30. In combination with the yoke and the chair seat frame pivoted thereon, the slotted bar on the yoke having the abutment with concave face, the slotted and toothed link connected with the seat frame, the connected disk and pinion in the bar slot journaled on the bar, so as to be movable to and from the abutment, a sliding block on the bar having a concave face to engage the disk on the side away from the abutment on the bar, and the screw with conical shank adapted to engage a portion of such block and force the latter toward the disk and abutment, substantially as and for the purpose described.

31. In a foot rest for dental, surgical and other chairs, the foot support carrying part and the two rollers flattened on opposite sides journaled in such part, the one being journaled above and beyond the other with reference to the part of the foot rest to be attached to the chair proper, substantially as and for the purpose shown.

32. In a dental, surgical or other chair, in combination with the back frame provided with series of notches, the child's seat made detachable from the back frame having folding arms provided with hooks to engage the notches, so as to hold it substantially in horizontal position, and the lugs adapted to be hooked into any of the notches to sustain the said seat in an upright position against the back frame, whereby said seat forms an adjustable support for the back of the chair occupant, substantially as and for the purpose set forth.

In testimony that I claim the foregoing I have hereunto set my hand this 16th day of February, 1891.

EDMUND PEASE STILES.

Witnesses:
F. M. COVERT,
R. M. ARMSTRONG.